Nov. 4, 1941.    L. L. DOLLINGER    2,261,846
EXERCISING MACHINE
Filed March 30, 1940    2 Sheets-Sheet 1

INVENTOR
Lewis L. Dollinger
BY
Eric Schinger
ATTORNEY

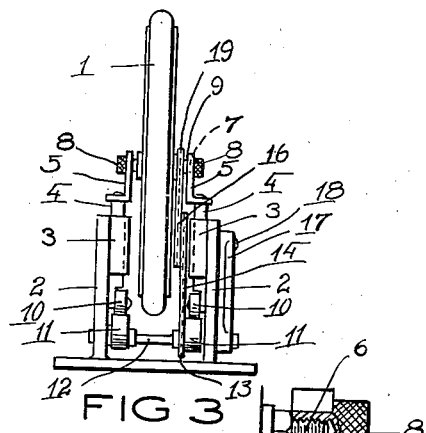
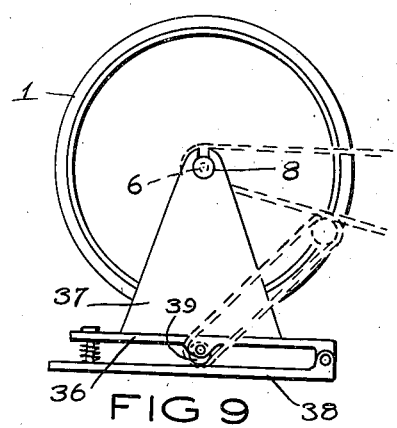
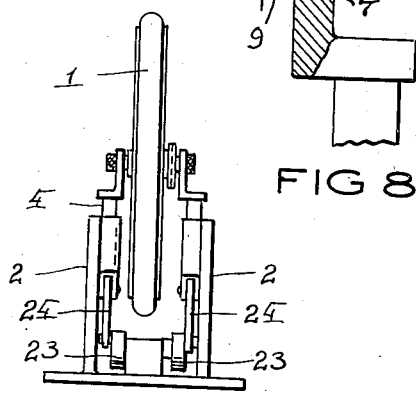
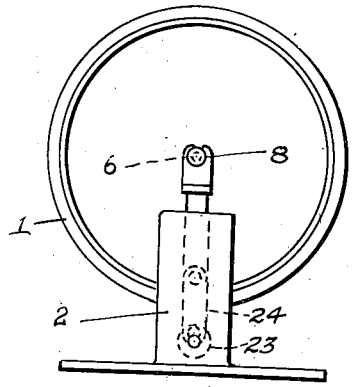
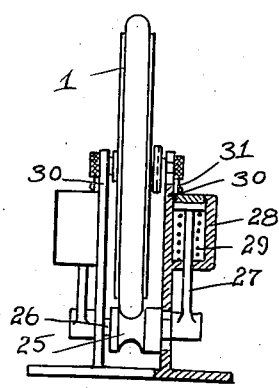
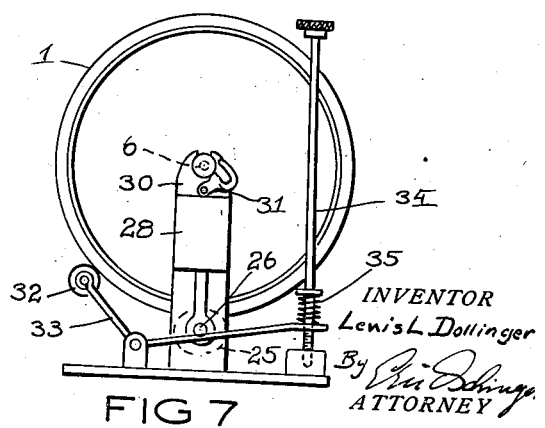
INVENTOR
Lewis L. Dollinger
ATTORNEY Patented Nov. 4, 1941

2,261,846

UNITED STATES PATENT OFFICE 2,261,846

EXERCISING MACHINE

Lewis L. Dollinger, Rochester, N. Y.

Application March 30, 1940, Serial No. 326,993

5 Claims. (Cl. 272—73)

This invention relates to exercising machines and has for its principal object to provide a novel mechanism with which a standard bicycle may be quickly and easily transformed into a stationary exercising machine.

Another object of this invention is to provide an exercising machine which will exercise the body with a movement simulating the movement of the body of a person riding horseback.

A further object of this invention is to provide a stationary bicycle exercising machine which may be regulated to increase or decrease the effort necessary to operate the machine.

All these and other objects and attendant advantages of the invention will become more readily apparent from the detailed description thereof which follows, reference being had to the accompanying drawings in which Figure 1 is a side elevation of a bicycle and the apparatus with which it cooperates to provide an exercising machine.

Figure 3 is a rear elevation of the rear wheel of a bicycle and the apparatus on which it is supported for exercising purposes as illustrated in Figure 1.

Figure 4 is a rear elevation of the rear wheel of a bicycle and a modified form of the apparatus used in conjunction therewith for exercising purposes.

Figure 5 is a side elevation of the bicycle wheel and apparatus illustrated in Figure 4.

Figure 6 is a rear elevation of the rear wheel of a bicycle supported on another modified form of the apparatus used in conjunction therewith for exercising purposes.

Figure 7 is a side elevation of the bicycle wheel and modified form of apparatus illustrated in Figure 6.

Figure 8 is an enlarged detail view of one of the supporting connections between the axle of the bicycle wheel and the apparatus.

Figure 9 is a side elevation of still another modified form of the bicycle exercising machine.

Figure 1:
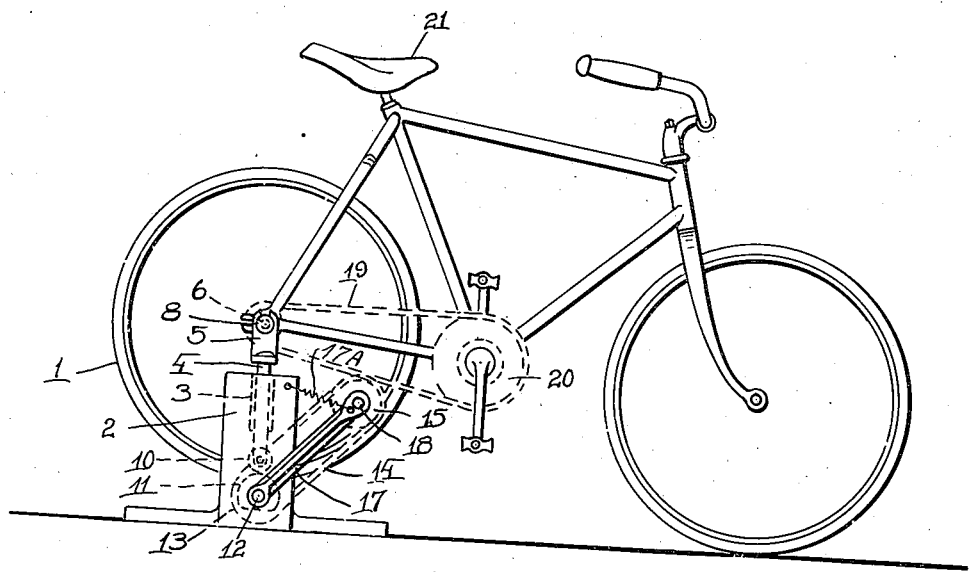

The exercising machine as illustrated in the several figures of the drawings utilizes a standard bicycle as the principal exercising medium and thus provides in the operation thereof in all of its forms the means for efficiently exercising the body as if the operator were actually riding a bicycle. In the form of the machine illustrated in Figure 1, the rear wheel 1 of the bicycle is supported on an apparatus which comprises a suitable base on which are mounted a pair of uprights 2, 2. Each of these uprights has a vertical guide 3 in which are mounted to slide the posts 4, 4. These posts carry at the top a bracket 5 which is bifurcated to removably support the axle 6 of the wheel 1. To prevent the threaded axle end from being damaged in its support on the brackets and to provide at the same time a firm connection between the wheel and the apparatus, a sleeve 7 is threaded onto the axle to cover the thread thereof and at the same time clamp the bracket between its head 8 and the shoulder 9 of the axle.

The bottom of the posts 4, 4 each carry an antifriction roller 10 which rests on the peripheral cams 11, 11. These cams are mounted on the shaft 12 and are adapted to be rotated by the sprocket 13. The latter is driven by the endless sprocket chain 14 from the sprocket 15 which in turn is rotated by the sprocket 16. An arm 17 is mounted to swing on one of the uprights 2 and carries the shaft 18 on which both the sprockets 15 and 16 are mounted so that by means of this arm the sprocket 16 may be swung into mesh with the bicycle chain 19 and rotated thereby on the movement thereof by the crank sprocket 20. A spring 17A is located between the arms 17 and the upright 2 in order to keep the sprocket 16 in mesh with the bicycle chain 19.

The cams 11 have a cam surface which is adapted to raise and lower the posts 4 on the rotation thereof to thus give the rear of the bicycle an up and down movement so that the person operating the machine and resting on the saddle 21 will have his body exercised as if he were on horseback. In addition the movement of the crank sprocket for the operation of the exercising apparatus will give the operator the same exercise he would get in the operation of a standard bicycle.

Figure 2:
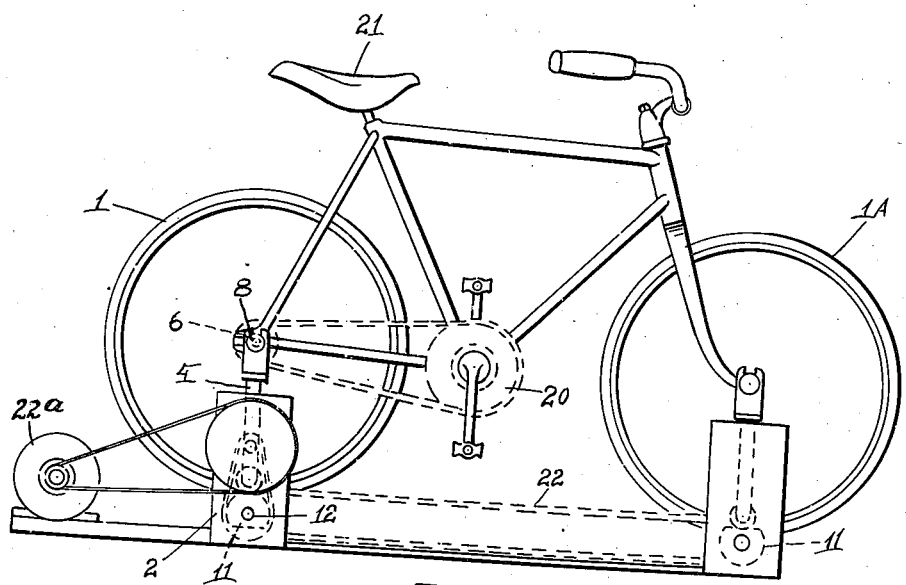
Figure 2 is a side elevation of a bicycle and a modified form of the apparatus which make up the exercising machine.

In the form of the machine illustrated in Figure 2 both the rear wheel 1 and the front wheel 1A are supported on posts which are raised and lowered as above described. However the raising and lowering of each wheel is independent of the other so that as one is raised the other may be lowered in such a manner as to give the body of the person on the seat of the bicycle a movement in simulation of the movement of the body of a person on horseback with the horse at a canter. The operating mechanism of the front and rear wheels are connected by the sprocket chain 22 and the entire apparatus is driven by an electric motor 22A connected by suitable driving means with the apparatus.

In Figures 4 and 5 the cam and roller driving mechanism are replaced by a crank and link connection which comprises the cranks 23, 23 and the links 24, 24 which connect the cranks 23 with the posts 4, 4 so that on the operation of the cranks in any suitable manner the posts are raised and lowered for the exercising movement of the apparatus.

In Figures 6 and 7 I have illustrated another modified form of mechanism for producing an up and down movement of the rear of a bicycle for exercising purposes. In this mechanism the rear wheel 1 has its tire supported on a grooved wheel 25 which has an irregular periphery and is mounted to rotate on an axle 26. The latter is suspended at each end by a plunger rod 27 which in turn has its plunger yieldingly supported in a cylinder 28 on springs 29. The traction between the tire of the bicycle wheel and the periphery of the roller causes the tire to rotate the roller so that its irregular outline raises and lowers the wheel while it is yieldingly suspended on the springs 29. The axle ends are adapted to slide up and down in the bifurcated top of the uprights 30, 30 to permit a vertical movement of the wheel.

In order to fixedly hold the wheel on the uprights, latch members 31 are adapted to engage the ends of the axle shaft and hold it locked against vertical movement in the uprights. When this is done a brake roller 32 carried by the arm 33 may be forced against the perimeter of the tire of the wheel so as to build up a resistance against the rotation of the wheel. In this way the person operating the bicycle can make it as easy or as difficult to operate the bicycle depending on how much effort he wishes to exert for the exercise. A threaded rod 34 which is conveniently reached by the person on the bicycle is adapted for the operation of the arm 33 thru the spring 35 and regulates the pressure of the brake roller against the wheel.

In Figure 9 I have illustrated still another form of mechanism for the apparatus. In this form the base 36 of the apparatus which carries the uprights 37 for the support of the wheel, is mounted to swing on a sub-base 38. A cam 39 is mounted to rotate on the under side of the base 36 in engagement with the sub-base 38 so that the rotation thereof in any suitable manner causes the base 36 to swing on the base 38 and raise and lower the wheel correspondingly.

From the foregoing it will be apparent that I have devised a novel way of utilizing a standard bicycle for a novel stationary exercising machine and while the embodiments of my invention which are shown and described are practical and preferred, it is understood that these embodiments are susceptible of modifications and I do not wish to limit myself to such precise constructions, but consider that I am at liberty to make such changes and alterations as fairly come within the scope of the appended claims.

I claim:

1. In an exercising machine the combination of a bicycle, movable supporting means for revolvably supporting one of the wheels of said bicycle, and means operated on the rotation of said wheel on said movable supporting means for causing an up and down movement of said supporting means and said wheel.

2. In an exercising machine, the combination of a bicycle, movable supporting means for revolvably supporting both of the wheels of said bicycle, and means causing an up and down movement of both of said wheels.

3. In an exercising machine the combination as set forth in claim 2 in which the means causing the up and down movement of each wheel are separate and out of step relative to each other's movement.

4. In an exercising machine the combination of a bicycle, a base, a pair of standards on said base, a movable post on each of said standards, means carried by each of said posts for removably and revolvably supporting the rear wheel of said bicycle between them and said standards, cam means for imparting an up and down movement to said posts, and means operating said cam means on the operation of said rear wheel.

5. In an exercising machine the combination of a bicycle having a sprocket chain drive, a base, a pair of standards on said base, a post vertically movable on each of said standards for removably and revolvably supporting the rear wheel of the bicycle between said standards, means for imparting an up and down movement to said posts, an arm mounted to swing on said base, a sprocket carried by said arm for engagement with said sprocket chain drive, and driving means operated by said sprocket for operation of said first named means on the operation of said bicycle.

LEWIS L. DOLLINGER.